June 25, 1929.  W. F. DALZEN.  1,718,536
TAP
Filed July 25, 1927

Inventor
William F. Dalzen
By Johng Harness
Attorney

Patented June 25, 1929.

1,718,536

UNITED STATES PATENT OFFICE.

WILLIAM F. DALZEN, OF DETROIT, MICHIGAN, ASSIGNOR, TO DU-MORE TAP & TOOL COMPANY, A CORPORATION OF MICHIGAN.

TAP.

Application filed July 25, 1927. Serial No. 208,138.

This invention relates to machine taps, the principal object being to provide a new and improved design wherein a more perfect thread will be obtainable with the same.

Another object is to provide a taper or plug tap of novel construction in which the wear on the tap will be reduced and work will be performed thereby in an easier and more efficient manner.

Another object is to provide a tap having a circumferentially unbroken surface of at least 180 degrees, the remainder of the surface being circumferentially broken by a pair of spaced axially extending grooves of a depth greater than the depth of the teeth of the tap.

A further object is to provide a tap having a tapered end with a circumferentially unbroken surface of at least 180 degrees and a narrow surface portion bounded by a pair of spaced grooves, the cutting face of each thread portion on the narrow portion of the tap at the tapered end thereof presenting an area less than the area of the cutting face of the corresponding portion on the circumferentially wide portion of the tap next succeeding it, and greater than the area of the cutting face of the corresponding thread portion on the circumferentially wide portion of the tap next preceding it.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the different views,—

Figure 1:
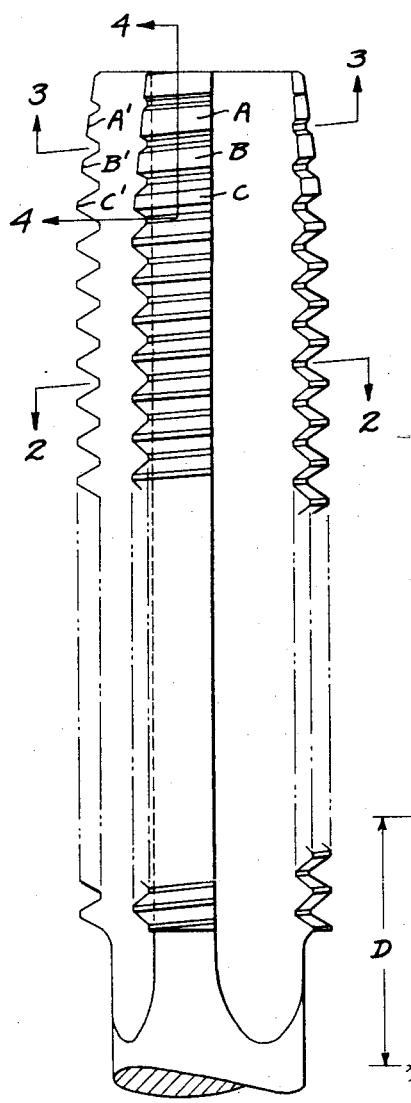
Fig. 1 is a side elevation of a tap constructed in accordance with the present invention.
Figure 1:
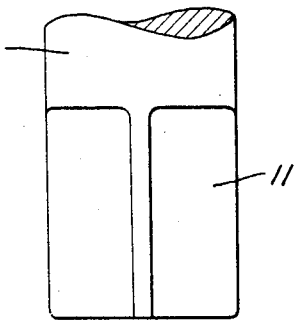
Figure 3:
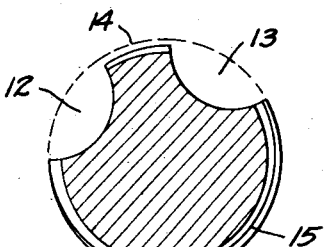
Fig. 3 is a sectional view taken on the line 3—3 of Fig. 1.
Figure 2:
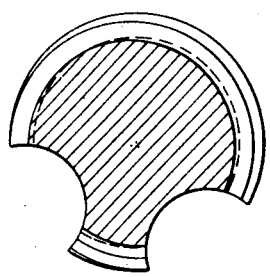
Fig. 2 is a sectional view taken on the line 2—2 of Fig. 1.

In taps provided with the conventional four equally spaced grooves, I have found that imperfect threads often result in the piece of work being tapped, due to the fact that there is not sufficient circumferential bearing surface for the teeth of the tap, particularly where spots of hard material are encountered by the teeth of the tap in the operation of tapping. By the use of the present invention I provide a tap in which a large continuous circumferential bearing surface is provided on the tap whereby it is constantly held in perfect axial alignment with the axis of the hole being tapped, thereby resulting in a perfect thread.

By a further feature of the present invention, I provide a tap of the taper or plug type which requires but very little effort to work with, and which relieves the strain in the tap due to work being performed thereby. I accomplish this result by so proportioning the teeth on the circumferentially narrow portion of the tap that the cutting face of each tooth thereon presents an area less than the cutting face of the tooth on the circumferentially wide portion of the tap next succeeding it, and greater than the cutting face of the tooth on the circumferentially wide portion of the tap next preceding it.

Referring to the accompanying drawing, I illustrate a tap of the taper or plug type, provided with a conventional shank 10 terminating in the usual squared end 11. The body portion of the tap is provided with two grooves 12 and 13 extending axially thereof from one end of the body portion to the other, and of a depth greater than the depth of the threads or teeth of the tap. The grooves 12 and 13 are spaced from each other leaving a relatively narrow circumferentially extending portion 14 therebetween on one side of the tap, and leaving a relatively circumferentially wide portion 15 between the same on the other side of the tap. The grooves 12 and 13 are preferably so spaced with relation to each other that the wide portion 15 extends circumferentially for more than 180 degrees of the circumference of the tap. The grooves 12 and 13, as in the conventional constructions, expose end areas of the threads or teeth which serve as cutting edges in passing through the material being tapped. By forming the tap with a wide portion 15 greater than 180 degrees of circumference of the tap, the thread portions thereof provide a bearing in the opening being tapped which prevents any misalignment of the tap with respect to the hole, and prevents any wobbling of the tap in the hole, and at the same time the narrow portion of the tap serves to provide an additional cutting edge aiding in the removal of the material from the walls of the hole or opening being tapped.

Figure 4:
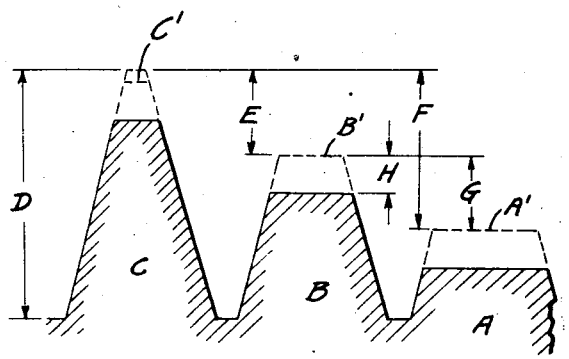
Fig. 4 is a more or less diagrammatic sectional view taken on the line 4—4 of Fig. 1, illustrating the relation between the cutting teeth of the circumferentially narrow portion of the tap and the cutting teeth of the circumferentially wide portion of the tap next succeeding the same.

In order to reduce the amount of energy necessary to screw the tap through the opening upon which it is to perform work, to increase the life of the tap, and to reduce the strain in the tap itself, I so form the teeth at the tapered end of the tap on the narrow portion 14 thereof that each of the teeth on the narrow portion removes substantially half of the material left by the tooth next preceding it on the wide portion 15 which would ordinarily be left to be removed by the next succeeding tooth on the wide portion 15. To illustrate this, reference being had to Fig. 4, which is a more or less diagrammatic section taken axially of the tap on the line 4—4 Fig. 1, I have designated three of the end teeth on the narrow portion 14 of the tap as A, B and C and the corresponding succeeding teeth on the wide portion 15 of the tap as A', B' and C'. In Fig. 4 the teeth A, B and C are shown in full section and the teeth A', B' and C' are shown superimposed over the same by dotted lines. It will be noticed, by way of illustration, that the tooth B' lacks a distance E of being a tooth of full depth corresponding to D, and that the tooth A' lacks a correspondingly greater distance F of being a full depth tooth, or a distance greater than B' equal to the distance G. The tooth B of the narrow portion 14 of the tap lacks a distance of E plus H of being a full depth tooth, which distance is greater than E and less than F, preferably the distance E plus half of distance G so that the teeth B and B' will be called upon to remove substantially the same amount of the metal in tapping a hole. The same relation exists between the teeth A and A', C and C' and any other corresponding teeth of portion 14 and 15 of the tap, which are called upon to remove metal while the operation of tapping is being performed by the tap.

Formal changes may be made in the specific embodiment of the invention described without departing from the spirit or substance of the broad invention, the scope of which is commensurate with the appending claims.

What I claim is:

1. A taper tap provided with a circumferentially unbroken surface of at least 180 degrees, the remainder of said surface provided with a pair of spaced longitudinally extending grooves forming a narrow axially extending surface, the cutting teeth of said narrow surface being reduced in size whereby each of said teeth acts as a roughing cutter for the corresponding tooth on the wide portion of said tap next succeeding it.

2. In a tap provided with a tapered end, a circumferentially unbroken surface of at least 180 degrees, a pair of longitudinally extending spaced grooves in the remainder of the surface of said tap forming a circumferentially relative narrow longitudinally extending surface therebetween, each tooth of said narrow portion at said tapered end being of a size intermediate the size of the teeth on the wide portion immediately preceding and succeeding it.

3. In a tap provided with a tapered end, a circumferentially unbroken surface of at least 180 degrees, and a narrow surface portion bounded by a pair of spaced grooves, the cutting face of each thread portion on said narrow portion at said tapered end presenting an area less than the cutting face of the thread portion on the circumferentially wide portion of the tap next succeeding it, and greater than the cutting face of the thread portion on the circumferentially wide portion of the tap next preceding it.

4. A tap provided with a threaded circumferentially unbroken surface of at least 180 degrees, the remainder of said surface being broken circumferentially by a pair of spaced grooves of greater depth than said threads, and the surface between said grooves, included in said remainder, being threaded whereby two cutting edges are presented for each full turn of said threads around said tap.

WILLIAM F. DALZEN.